(12) United States Patent
Lien

(10) Patent No.: US 9,577,487 B2
(45) Date of Patent: Feb. 21, 2017

(54) ELECTRONIC CYLINDER WITH WATERPROOF STRUCTURE

(71) Applicant: WFE TECHNOLOGY CORP., Taichung (TW)

(72) Inventor: Jack Lien, Taichung (TW)

(73) Assignee: WFE TECHNOLOGY CORP., Taichung (TW)

( * ) Notice: Subject to any disclaimer, the term of this patent is extended or adjusted under 35 U.S.C. 154(b) by 248 days.

(21) Appl. No.: 14/500,086

(22) Filed: Sep. 29, 2014

(65) Prior Publication Data

US 2016/0094103 A1 Mar. 31, 2016

(51) Int. Cl.
| | | |
|---|---|---|
| *E05B 47/02* | (2006.01) | |
| *H02K 5/10* | (2006.01) | |
| *E05B 47/06* | (2006.01) | |
| *E05B 17/00* | (2006.01) | |
| *E05B 47/00* | (2006.01) | |

(52) U.S. Cl.
CPC ............... *H02K 5/10* (2013.01); *E05B 17/002* (2013.01); *E05B 47/0642* (2013.01); *E05B 47/0012* (2013.01); *E05B 2047/0026* (2013.01); *Y10T 70/5823* (2015.04); *Y10T 70/5827* (2015.04); *Y10T 70/7102* (2015.04)

(58) Field of Classification Search
CPC ............... E05B 17/002; E05B 47/0642; E05B 2047/0026; E05B 47/0012; H02K 5/10; H02K 5/124; Y10T 70/5823; Y10T 70/5827; Y10T 70/7102; Y10T 70/7062
USPC ... 70/218, 222, 223, 277, 278.7, 279.1, 422, 70/149, 188, 189, 467, 278.1–278.3, 70/283.1; 292/144; 74/732.1
See application file for complete search history.

(56) References Cited

U.S. PATENT DOCUMENTS

| | | | | |
|---|---|---|---|---|
| 3,660,999 A | * | 5/1972 | Janzen ................ | E05B 47/0044 70/276 |
| 4,380,161 A | * | 4/1983 | Bassi ................ | B60K 15/0409 70/168 |
| 5,634,359 A | * | 6/1997 | Huebschen ............. | E05B 9/086 70/367 |
| 6,209,369 B1 | * | 4/2001 | Freck .................... | E05B 17/002 70/375 |
| 8,756,963 B2 | * | 6/2014 | Le ............................. | E05C 1/14 292/169 |
| 9,316,025 B2 | * | 4/2016 | Lien .................... | E05B 47/0012 |
| 2009/0165512 A1 | * | 7/2009 | Bellamy ............. | E05B 47/0011 70/278.3 |

(Continued)

*Primary Examiner* — Lloyd Gall
(74) *Attorney, Agent, or Firm* — Muncy, Geissler, Olds & Lowe, P.C.

(57) ABSTRACT

An electronic cylinder includes a knob; a cylinder core connected with the knob; a motor having a protrusion block; a clutch unit; a coupler including a chamber receiving the clutch unit and a front portion having a front end face with an opening constituted by an injection channel indented inwardly from the end face and extending from a first point of a periphery confining the end face, an recess indented inwardly from a bottom surface of the injection channel and an outflow channel indented inwardly from the end face and extending from a second point of the periphery, the bottom of the recess being formed with a hole permitting extension of an axle for engaging the clutch unit, a preventing block in a depth of the opening such that after assembly, the end face abuts against the motor; and a waterproof filler hermetically filling the recess.

9 Claims, 7 Drawing Sheets

(56) References Cited

U.S. PATENT DOCUMENTS

2010/0122561 A1* 5/2010 Lui ................... E05B 47/0673
                                                    70/277
2012/0006082 A1* 1/2012 Peng ................... E05B 47/068
                                                    70/277

* cited by examiner

ELECTRONIC CYLINDER WITH WATERPROOF STRUCTURE

BACKGROUND OF THE INVENTION

1. Field of the Invention

The present invention relates generally to an electronic cylinder and more particularly to an electronic cylinder having waterproof structure between a motor and other component so as to provide waterproof effect.

2. The Prior Arts

The advance of electronic technology results in development of electronic locks having precise and complicated means for identifying or verifying individual identifications, such as input pins, chip sensors, fingerprint recognition, iris diaphragm recognition, thereby tremendously increasing safety personal belongings. The majority of conventional mechanical locks are gradually replaced by digital or electronic locks. Under such circumstances, it is the ultimate goal of the manufacturers to produce electronic locks to meet or fulfill the demand or requirement of the consumers.

The primary object of using an electronic lock is to prevent theft. In addition to verifying precisely and definitely individual identifications, the electronic lock itself should possess durable wearing or corrosion, lesser damage and malfunction are some major factors what the consumers consider generally when purchasing or selecting the electronic locks. The lesser the malfunction, the more the durability increases, the electronic lock provide the more safety to the users. The lesser malfunction of electronic lock depends on materials from which the components are fabricated, such as aging and fatigue of plastic substances, service life of electronic elements, motor durability, waterproof, fire-proof and moisture-proof of battery or circuit design play important role and affect the usage span of the electronic lock. In case the electronic lock one uses malfunctions often and hence cannot provide safety measures to his belongings, which in turn may hinder the user to go out safely or enter his house conveniently.

Generally, in addition to verifying and sensing elements, the motor disposed within electronic cylinder for activating a latch assembly so as to lock and unlock a door is the most important element in an electronic lock. Presently available electronic cylinders in the markets are not provided with anti-moisture or waterproof effects. Taiwan being located in sub-tropical area (rainy and humid environment), moisture can easily penetrate through the lock heart or other parts via gaps connecting the components. Especially since the electronic lock is usually provided on the external door, which adds moisture as rain or splashing water infiltration, resulting in malfunction of internal components in the electronic lock. Therefore, it is highly desired to find a way to protect the invasion of moisture into the motor while strengthening the structure of waterproof function in other parts to enhance waterproof effects of the electronic cylinder, thereby decreasing malfunction of the electronic lock.

SUMMARY OF THE INVENTION

A primary objective of the present invention is to provide an electronic lock, simply an electronic cylinder including a motor which has filled by waterproof filler so as to provide a waterproof structure thereto, so as to permit traditional performance in a way while preventing malfunction of the motor in the other way.

Another objective of the present invention is to provide an electronic cylinder with enhanced waterproof structure such that waterproof ring and waterproof washers are provided at gaps existing among the elements so as to prevent invasion of water, thereby causing the electronic cylinder of the present invention to possess waterproof effects.

An electronic cylinder of the present invention accordingly includes an exterior knob; an exterior cylinder core connected securely to an end of the exterior knob; a motor disposed within the exterior cylinder core, having a protrusion block and an axle extending axially and outwardly from the protrusion block; a clutch unit connected operably to the motor; a cam member associated with the clutch unit and the motor for driving a latch assembly to lock or unlock the door upon causing rotation between the clutch unit and the motor; a cylindrical coupler seat disposed between the motor and the clutch unit, including a rear chamber for receiving the clutch unit and a front portion located opposite to the rear chamber and having a front end face provided with a blocking opening constituted by an injection channel indented inwardly from the front end face and extending inwardly and radially from a first point of a periphery confining the front end face, an recess indented inwardly and axially from a bottom surface of the injection channel and an outflow channel indented inwardly from the front end face and extending inwardly and radially from a second point of the periphery opposite to the first point to terminate at the recess, the bottom surface of the recess being formed with a through hole permitting extension of the axle for operably engaging the clutch unit, the front portion further having a preventing block formed between the bottom surface of the recess and the an outflow channel, the preventing block being located in a depth with respect to the front end face complementing with the protrusion block of the motor such that once the protrusion block is seated in the recess, the front end face of the coupler seat abuts fittingly against the motor around the protrusion block; and a waterproof filler hermetically filling the recess in the coupler seat.

In one embodiment of the present invention, the protrusion block of the motor is generally cylindrical. The recess has a shape complementing with the protrusion block.

In another embodiment of the present invention, the preventing block 513 is generally semi-circular in shape.

Preferably, the waterproof filler is Polydimethylsiloxane (PDMS).

According to one embodiment of the present invention, the exterior cylinder core defines an interior chamber for receiving the motor. The electronic cylinder of the present invention further includes a waterproof ring sleeved around an outer surface of the cylindrical coupler seat so as to abut hermetically against the interior chamber, thereby providing an additional waterproof effect among the motor, the cylindrical coupler seat and the exterior cylinder core.

The electronic cylinder of the present invention further includes a first waterproof washer sandwiched between the exterior cylinder core and the exterior knob in order to provide additional waterproof effect therebetween.

In yet another embodiment of the present invention, the exterior knob includes an exterior housing and an interior housing that is located inside the exterior housing and that defines the end of the exterior knob for connected securely to the exterior cylinder core. The electronic cylinder of the present invention further includes a second waterproof washer disposed between the exterior and interior housings.

Owing to the waterproof filler hermetically filling the blocking opening in the cylindrical coupler seat, the motor located with the coupler seat is waterproof, thereby preventing damage done onto it. Simultaneously, since the waterproof ring and waterproof washers are disposed among the gaps connecting elements relative to one another, water is prevented from getting into the interior of the electronic cylinder of the present invention, thereby prolonging the service life of the present electronic cylinder.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
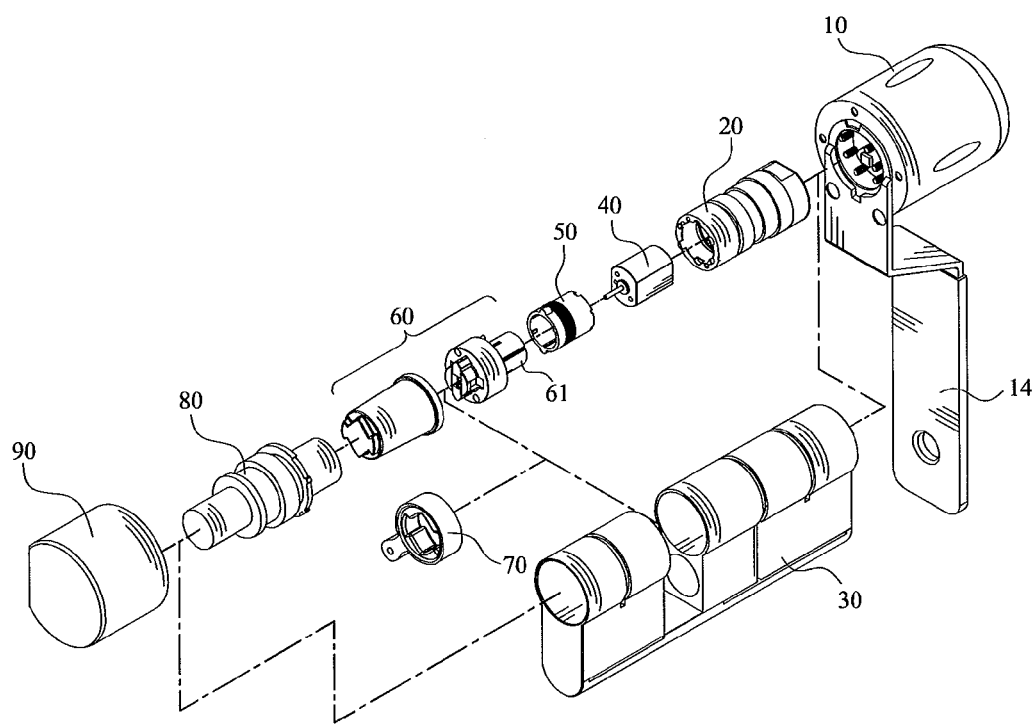
FIG. 1 is an exploded view of an electronic cylinder of the present invention having waterproof structure.

FIG. 1 is an exploded view of an electronic cylinder of the present invention having waterproof structure. As illustrated, the electronic cylinder of the present invention for a door includes an exterior knob 10, an exterior cylinder core 20, a lock housing 30, a motor 40, a clutch unit 60, a cam member 70 and a sensing device (not visible). The exterior knob 10 is generally installed on a front side of the door (not visible), which is provided with a handle 14. The exterior cylinder core 20 is disposed on a rear side of the door and is connected securely to an end of the exterior knob 10. The motor 40 is disposed within the exterior cylinder core 20. The clutch unit 60 is connected operably to the motor 40. The assembly of the clutch unit 60 and the motor 40 is disposed within the lock housing 30, which in turn is installed on the rear side of the door. The cam member 70 is associated with the clutch unit 60 and the motor 40 for driving a latch assembly which is generally connected with the lock housing 30 to lock or unlock the door with respect to the door frame (not visible) upon causing rotation of the cam member 70 when the clutch unit 60 is driven by the motor 40. The cam member 70 can include a transmission rod, oval-shaped paddle or any other mechanism operably connected to the latch assembly so long it can drive the latch assembly to open and close the door. The electronic cylinder of the present invention further includes an interior knob 90 which is generally installed on the rear side of the door (not visible) and an interior cylinder core 80 interconnecting the interior knob 90 and the clutch unit 60 in a known manner.

Figure 2:
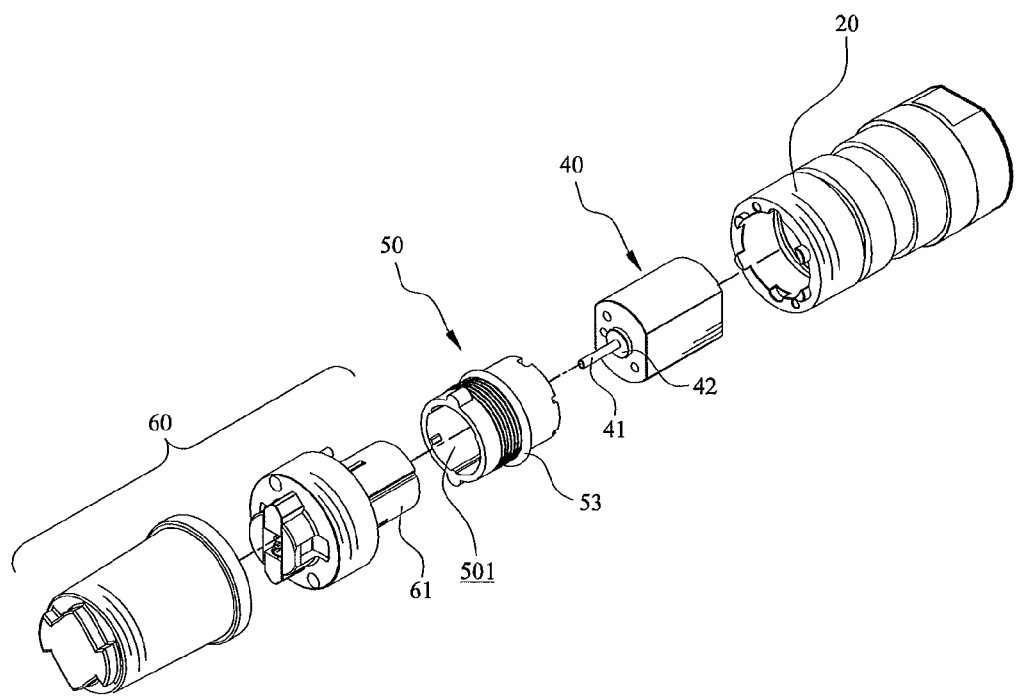
FIG. 2 is a perspective view of a clutch unit, a cylindrical coupler seat, a motor and an exterior cylinder core constituting the electronic cylinder of the present invention.

Referring to FIGS. 1 and 2, a cylindrical coupler seat 50 is disposed between the motor 40 and the clutch unit 60, includes a rear chamber 501 for receiving movably an extension portion 61 of the clutch unit 60.

The motor 40 has an annular protrusion block 42 and an axle 41 extending axially and outwardly from the protrusion block 42. The structure of the motor 40 should not be limited only the disclosed ones, any driving means can be employed so long as it can engage with the extension portion 61 of the clutch unit 60 so as to cause rotation therebetween.

The coupler seat 50 has a front portion that is located opposite to the rear chamber 501 and that has a front end face provided with a blocking opening 51 constituted by an injection channel 511 indented inwardly and axially from the front end face and extending inwardly and radially from a first point of a periphery confining the front end face, an annular recess 512 indented inwardly and axially from a bottom surface of the injection channel 511 and an outflow channel 514 indented inwardly from the front end face and extending inwardly and radially from a second point of the periphery opposite to the first point to terminate at the recess 512. The bottom surface of the recess 512 is formed with a through hole 52 via which the axle 41 extends for operably engaging the extension portion 61 of the clutch unit 60. The front portion further has a preventing block 513 formed between the bottom surface of the recess 512 and the outflow channel 514. The preventing block 513 is located in such a manner respect to the front end face complementing with the protrusion block 42 of the motor 40 such that once the protrusion block 42 is seated on the preventing block 513 in the recess 512, the front end face of the coupler seat 50 abuts fittingly and sealingly against the motor 40 around the protrusion block 42, thereby forming a communication passage between the coupler seat 50 and the motor 40 constituted by the above mentioned channels and recess. In this embodiment, the preventing block 513 is generally semi-circular in shape. However, the structure of the preventing block 513 should not be limited only to the disclosed ones, any other structure like cylinder or rectangular can be used so long it can achieve the desired purpose.

Figure 3:
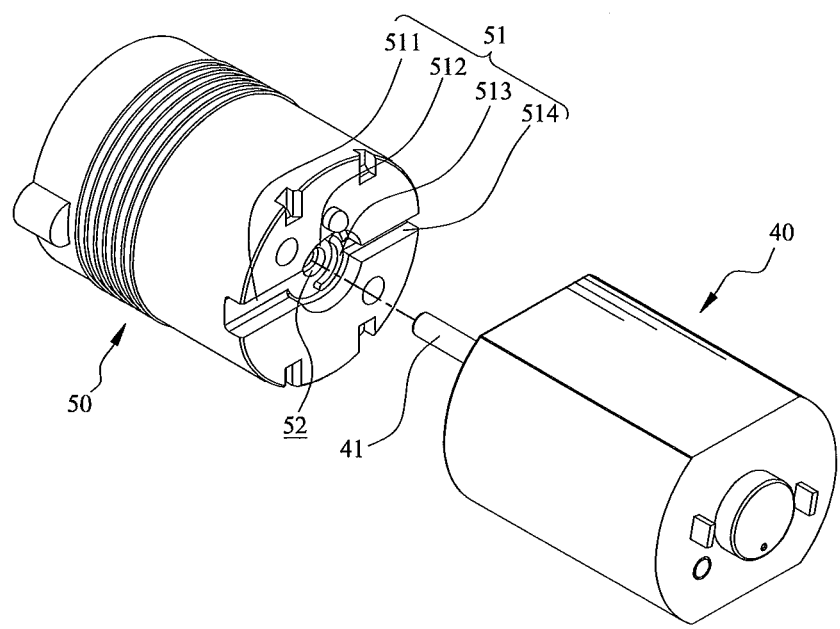
FIG. 3 is an enlarged view of the cylindrical coupler seat and the motor shown in FIG. 2.
Figure 4:
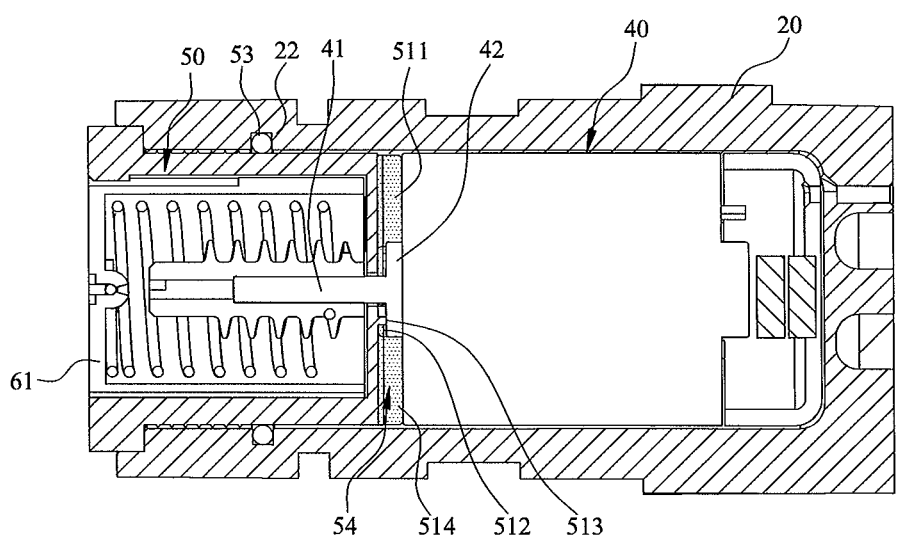
FIG. 4 is a cross-sectional view of assembled elements shown in FIG. 2.

Referring FIGS. 2 to 4, wherein FIG. 2 is a perspective view of the clutch unit 60, the cylindrical coupler seat 50, the motor 40 and the exterior cylinder core 20 cooperatively constituting the electronic cylinder of the present invention; FIG. 3 is an enlarged view of the cylindrical coupler seat 50 and the motor 40 shown in FIG. 2; and FIG. 4 is a cross-sectional view of assembled elements shown in FIG. 2. As illustrated, after assembly, the blocking opening 51 defines the communication passage between the coupler seat 50 and the motor 40 constituted by the above mentioned channels and recess. Under this condition, a waterproof filler 54 is injected from the injection channel 511 so as to hetmetically filling the recess 512 in the coupler seat 50 upon encountering the preventing block 513 and simultaneously filling the ambient space around the axle 41 and the outflow channel 514. Hence, the entire portion surrounding the protrusion block 42 is replete with the waterproof filler 54 such that in case of invasion of water via the clutch unit 60 and the cam member 70, water cannot penetrate into the motor 40, thereby providing waterproof effect to the motor 40.

In this embodiment, the waterproof filler 54 is Polydimethylsiloxane (PDMS). Any other filler, such as silicone oil and Vaseline® can be used so long they can provide hermetical sealing effect to the motor 40.

FIG. 4 is a cross-sectional view of assembled elements shown in FIG. 2. As shown, the exterior cylinder core 20 defines an interior chamber for receiving the motor 40. The electronic cylinder of the present invention further includes a waterproof ring 53 sleeved around an outer surface of the cylindrical coupler seat 50 so as to abut hermetically against an annular recess 22 formed in the interior chamber, so that water cannot invade into the gaps formed among the clutch unit 60, the cylindrical coupler seat 50 and the exterior cylinder core 20, thereby providing an additional waterproof effect among the clutch unit 60, the cylindrical coupler seat 50 and the exterior cylinder core 20.

Figure 5:
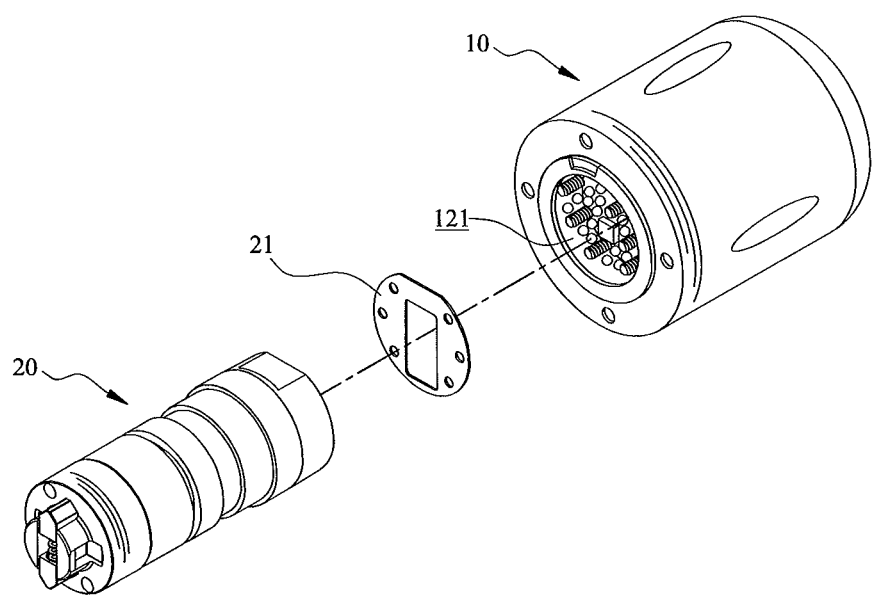
FIG. 5 shows how a first waterproof washer is sandwiched between the exterior cylinder core and the exterior knob shown in FIG. 1 in order to provide additional waterproof effect in the electronic cylinder of the present invention.

FIG. 5 shows how a first waterproof washer is sandwiched between the exterior cylinder core 20 and the exterior knob 10 shown in FIG. 1 in order to provide additional waterproof effect in the electronic cylinder of the present invention. As shown, the electronic cylinder of the present invention further includes a first waterproof washer 21 sandwiched between the exterior cylinder core and the exterior knob 10 in order to provide additional waterproof effect therebetween.

Figure 6:
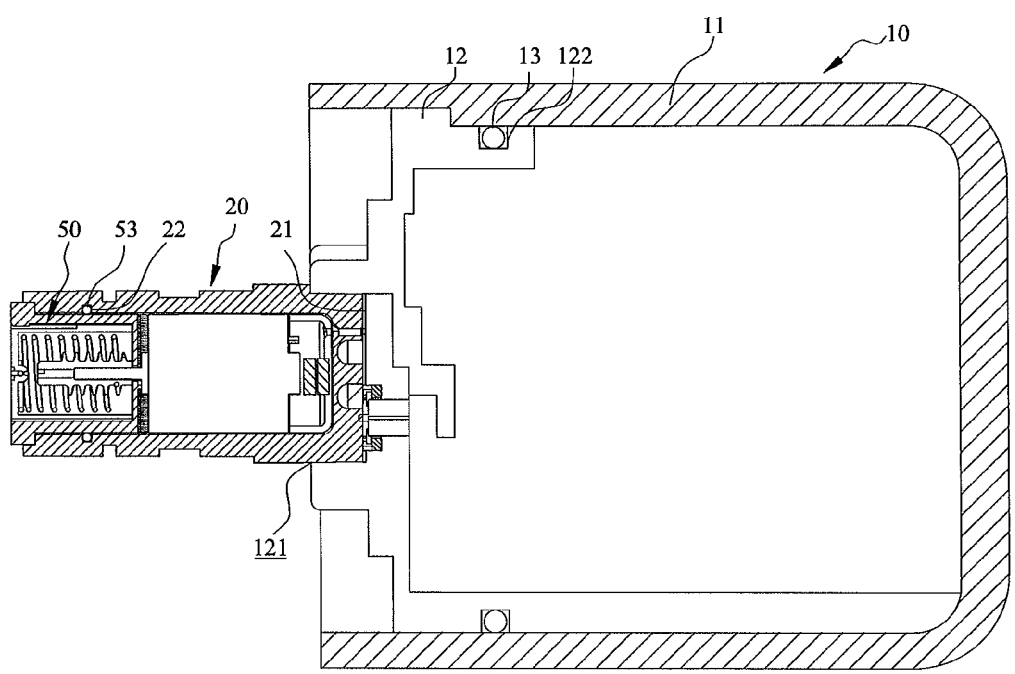
FIG. 6 is a cross-sectional view illustrating how a second waterproof washer is provided between the exterior cylinder core and in the exterior knob shown in FIG. 1 in order to provide additional waterproof effect to the electronic cylinder of the present invention.
Figure 7:
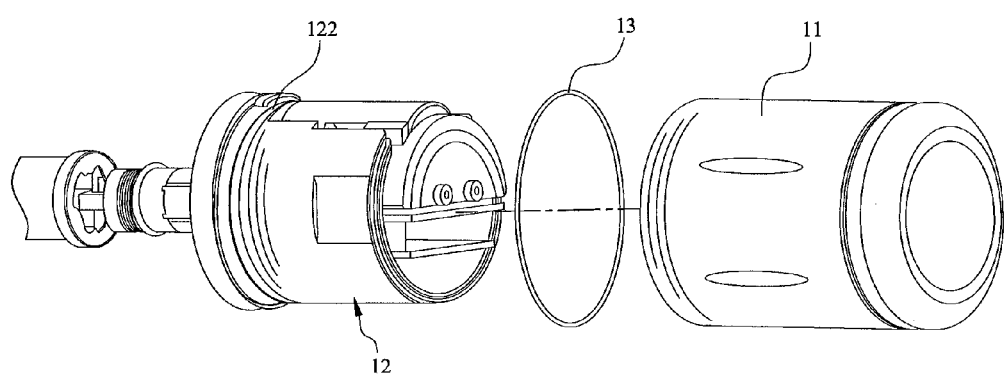
FIG. 7 shows an exploded and enlarged view of the exterior knob employed in the electronic cylinder of the present invention.

Referring to FIGS. 6 and 7, wherein FIG. 6 is a cross-sectional view illustrating how a second waterproof washer 21 (see FIG. 5) is provided between the exterior cylinder core 20 and in the exterior knob 10 shown in FIG. 1 in order to provide additional waterproof effect in the electronic cylinder of the present invention; and FIG. 7 shows an exploded and enlarged view of the exterior knob 10 employed in the electronic cylinder of the present invention. As shown, the electronic cylinder of the present invention further includes a waterproof washer 21 (see FIG. 5) sandwiched between the exterior cylinder core 20 and the exterior knob 10 in order to provide additional waterproof effect to a chamber 121 formed in the rear side of the exterior knob 10. Preferably, in this embodiment, the exterior knob 10 includes an exterior housing 11 and an interior housing 12 that is located inside the exterior housing 11 and that defines the end of the exterior knob 10 for connected securely to the exterior cylinder core 20. The electronic cylinder of the present invention includes a waterproof ring 13 disposed in an annular recess 122 formed on an outer surface of the interior housing 12 so as to abut sealingly against the inner surface of the interior housing 11, thereby providing an additional waterproof effect to the exterior knob 10.

One distinct feature of the present invention resides in that injection of the waterproof filler 54 is finished swiftly due to the following reasons. The injection channel 511 and the outflow channel 514 are aligned with each other, and have the same depth with respect to the front end face but a different width relative to each other, wherein the injection channel 511 has a larger width than the outflow channel 514 to facilitate injection of the waterproof filler 54 filling the blocking opening 51.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electronic cylinder for a door lock comprising:
   an exterior knob;
   an exterior cylinder core connected securely to an end of said exterior knob;
   a motor disposed within said exterior cylinder core, having a protrusion block and an axle extending axially and outwardly from said protrusion block;
   a clutch unit connected operably to said motor;
   a cam member associated with said clutch unit and said motor for driving a latch assembly to lock or unlock the door upon causing rotation of said cam member when said clutch unit is driven by said motor;
   a cylindrical coupler seat disposed between said motor and said clutch unit, including a rear chamber for receiving said clutch unit and a front portion located opposite to said rear chamber and having a front end face provided with a blocking opening constituted by an injection channel indented inwardly and axially from said front end face and extending inwardly and radially from a first point of a periphery confining said front end face, an annular recess indented inwardly and axially from a bottom surface of said injection channel and an outflow channel indented inwardly from said front end face and extending inwardly and radially from a second point of the periphery opposite to said first point to terminate at said recess, a bottom surface of said recess being formed with a through hole permitting extension of said axle for operably engaging said clutch unit, said front portion further having a preventing block formed between said bottom surface of said recess and said outflow channel, said preventing block being located in such a manner complementing with said protrusion block of said motor such that once said protrusion block of said motor is seated on said preventing block in said recess, said front end face of said coupler seat abuts fittingly against said motor around said protrusion block; and
   a waterproof filler hermetically filling said recess in said coupler seat.

2. The electronic cylinder according to claim 1, wherein said protrusion block of said motor is generally cylindrical, said recess having a shape complementing with said protrusion block.

3. The electronic cylinder according to claim 2, wherein said preventing block is generally semi-circular in shape.

4. The electronic cylinder according to claim 1, wherein said preventing block is generally semi-circular in shape.

5. The electronic cylinder according to claim 1, wherein said waterproof filler is Polydimethylsiloxane (PDMS).

6. The electronic cylinder according to claim 1, wherein said exterior cylinder core defines an interior chamber for receiving said motor, the electronic cylinder further comprising a waterproof ring sleeved around an outer surface of said cylindrical coupler seat so as to abut hermetically against said interior chamber in said exterior cylinder core, thereby providing an additional waterproof effect among said clutch unit, said cylindrical coupler seat and said exterior cylinder core.

7. The electronic cylinder according to claim 1, further comprising a waterproof washer sandwiched between said exterior cylinder core and said exterior knob in order to provide additional waterproof effect therebetween.

8. The electronic cylinder according to claim 1, wherein said exterior knob includes an exterior housing and an interior housing that is located inside said exterior housing and that defines said end of said exterior knob for connected securely to said exterior cylinder core, said electronic cylinder further comprising a waterproof ring disposed between said exterior and interior housings.

9. The electronic cylinder according to claim 1, wherein said injection channel and said outflow channel are aligned with each other, and have the same depth with respect to said front end face but a different width relative to each other or wherein said injection channel has a larger width and deeper depth than said outflow channel to facilitate injection of said waterproof filler filling said recess.

* * * * *